(No Model.)

J. D. BLAKER.
HARNESS.

No. 264,850. Patented Sept. 26, 1882.

WITNESSES:
A. B. Robertson.
Wm. Turner.

INVENTOR
John D. Blaker.
BY T. J. W. Robertson
ATTORNEY.

UNITED STATES PATENT OFFICE.

JOHN D. BLAKER, OF NEWTOWN, PENNSYLVANIA.

HARNESS.

SPECIFICATION forming part of Letters Patent No. 264,850, dated September 26, 1882.

Application filed July 22, 1881. (No model.)

*To all whom it may concern:*

Be it known that I, JOHN D. BLAKER, a citizen of the United States of America, residing at Newtown, in the county of Bucks and State of Pennsylvania, have invented certain new and useful Improvements in Harness; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement in harness; and it consists in a peculiar arrangement of the parts, whereby, as the animal holds back, the shafts are lifted, and a band attached to them is thereby brought in contact with the animal's belly, by which means the vehicle is securely held back without the breeching usually required in the ordinary harness.

Figure 1:
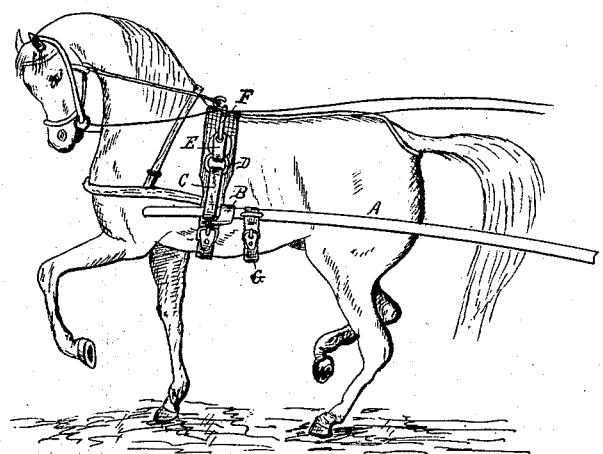
Figure 2:
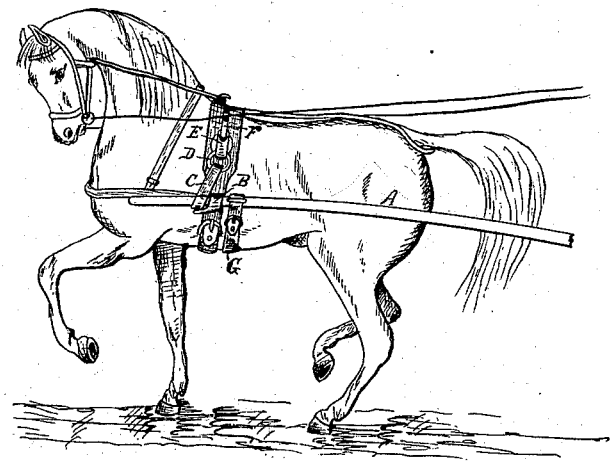

In the drawings, Figure 1 is a side view of a horse provided with my harness; Fig. 2, a similar view with the horse holding back, and Fig. 3 a detail of the band detached.

A represents the shafts of the vehicle to which the horse is attached, having a stop, B, (which may be a ring, as shown, or any other suitable device,) at a point just behind the place usually occupied by the tug C, which in this case is suspended from a ring, D, secured to the saddle by a loop, E, one end of which is riveted to the saddle and the other held by a strap, F, passing over the top of the saddle to a corresponding loop on the other side. I prefer this method of attaching the tugs, yet it is obvious that other means may be used; but care should be taken to have them strongly secured to the saddle, and preferably at a little above half the distance between the shafts and the top of the saddle.

Figure 3:
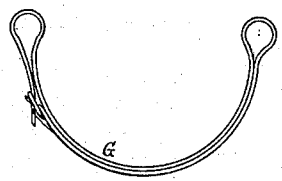

In the rear of the stop B, and about six inches from the back of the ordinary position of the tug, I secure a wide band, G, which should be double, as shown in Fig. 3; but I do not limit myself to this form, as a single strap may be used. This strap I secure to the shaft by loops passing into the shafts to prevent its slipping; but any other means of securing it may be employed, if desired.

The operation of my invention is as follows: When the horse is drawing the tug maintains the position shown in Fig. 1, leaving the band G loose; but as soon as the horse begins to back the tugs swing on the loop as a fulcrum, describing a curve and thereby raising the shaft, as represented in Fig. 2, thus bringing the band G in close contact with the body of the animal and tightening thereon, by which means the animal can securely hold back the vehicle without the use of the breeching usually employed, whereby a great saving in the first cost of the harness is made, besides the subsequent expenses for repairs.

I am aware that belly-bands have before been attached to shafts; but in such cases said bands have been directly under the tug, or substantially so, where they would not be adapted for holding back and would come in contact with the horse's legs, and would therefore be very objectionable, whereas in my case, the band being hung back of the tug, there is no chance of its coming in contact with the animal's legs, and it serves the purpose of holding back, as before explained.

Although I have shown and described the stop B to hold the tugs in place and loops to hold the band or strap in the rear of the tugs, I do not limit myself to this exact construction of these fastening devices, as it is obvious that any known equivalents for them that will keep the band in the rear of the tugs may be used without departing from the spirit of my invention, which consists more in the relative location of the band and tugs than in any special construction of their fastenings.

What I claim as new is—

The combination, with the shafts A, stop B, and the tugs C, swinging from the saddle, of the band G, secured by staples or loops to the shafts in the rear of the tugs, so that it cannot slide on the shafts under the tugs, whereby said band is kept in the rear of the tugs, substantially as and for the purpose described.

In testimony whereof I affix my signature in presence of two witnesses.

JOHN D. BLAKER.

Witnesses:
WM. M. SMITH,
GEO. F. GRAHAM.